Patented Sept. 5, 1933

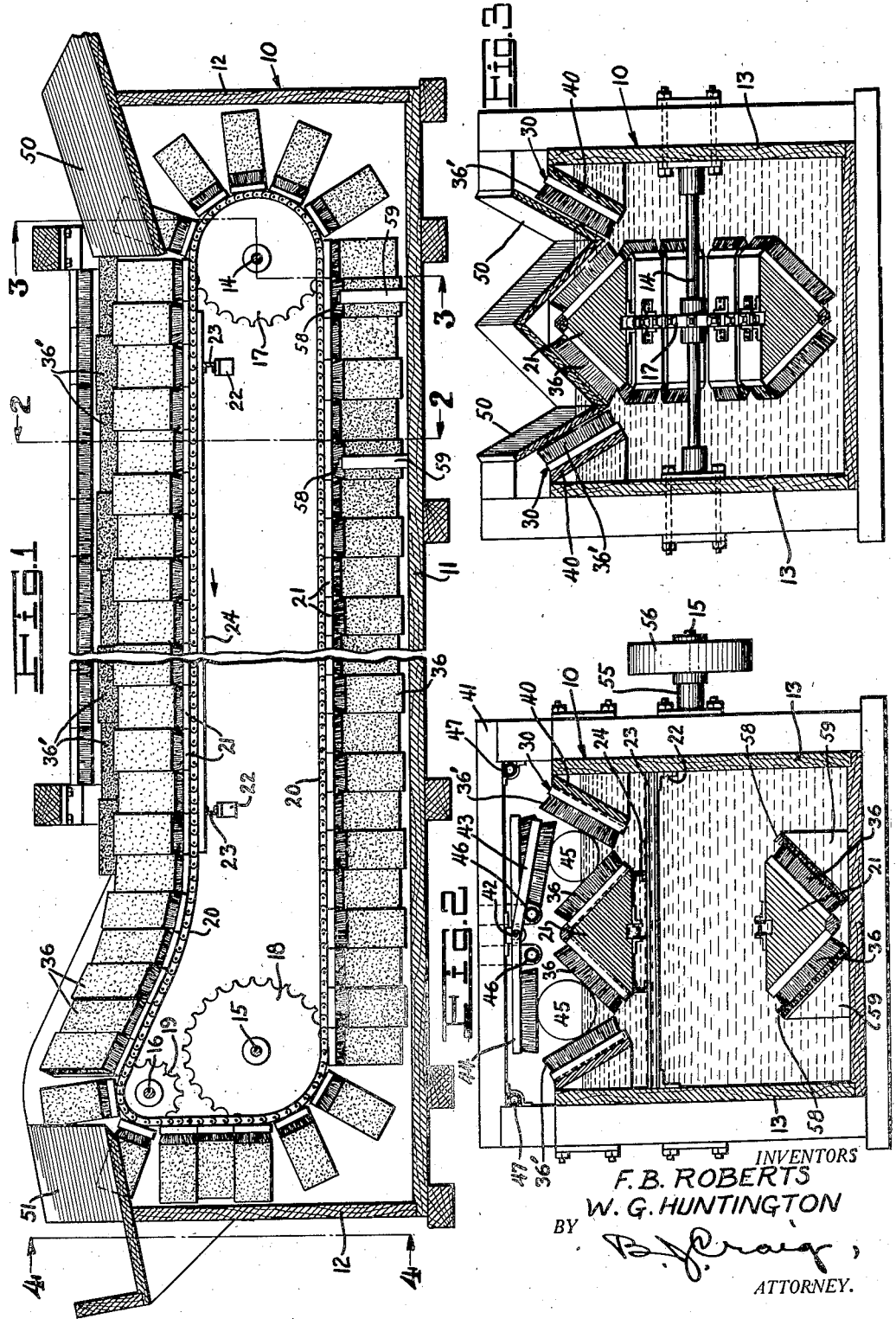

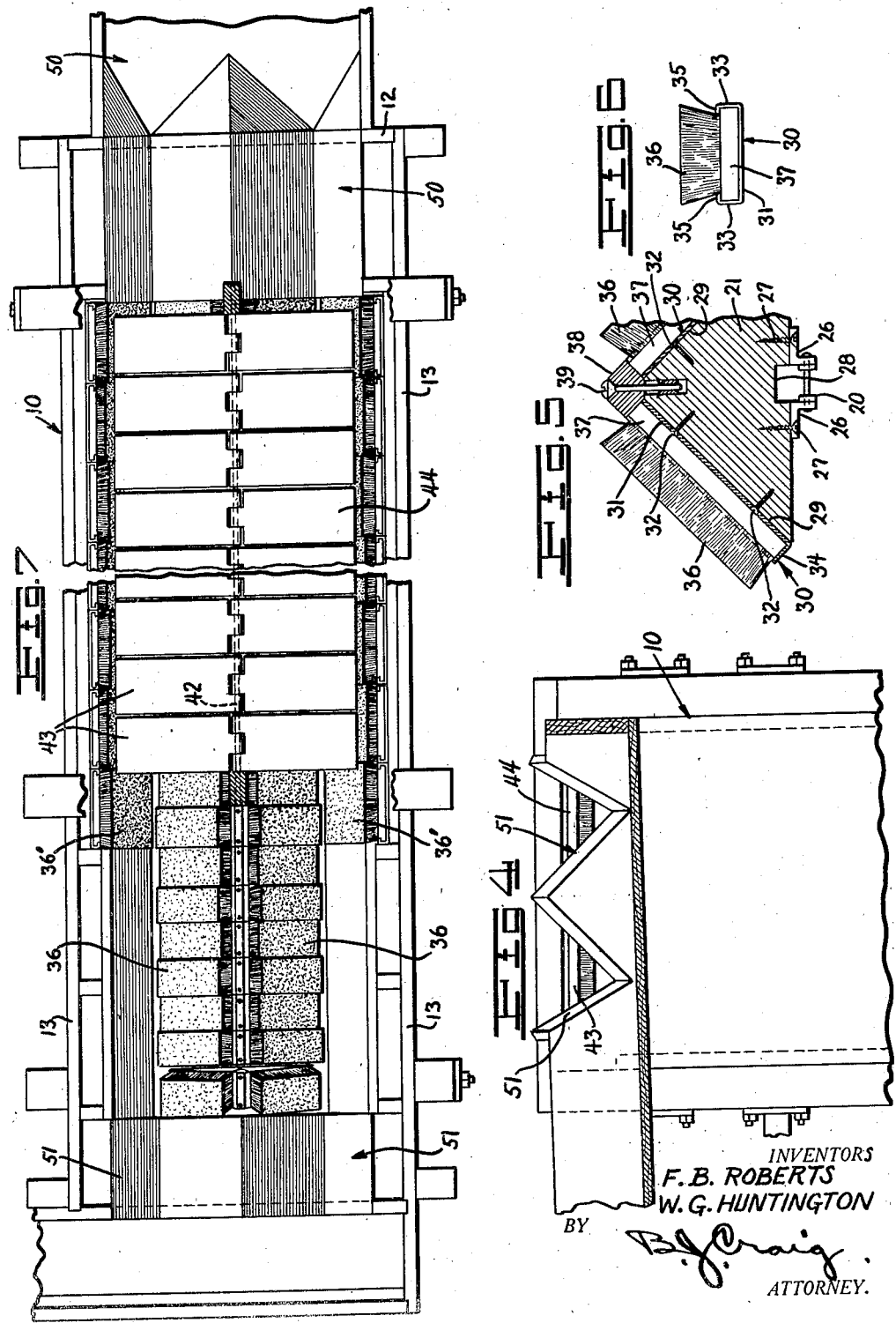

1,925,605

UNITED STATES PATENT OFFICE 1,925,605

FRUIT WASHING MACHINE

Frank B. Roberts and Willis G. Huntington, Anaheim, Calif., assignors to Food Machinery Corporation, San Jose, Calif., a corporation of Delaware Application February 13, 1929. Serial No. 339,506

13 Claims. (Cl. 146—202)

This invention relates to washing machines.

The general object of the invention is to provide an improved machine for washing citrus products.

A specific object of the invention is to provide a citrus washing machine including fixed and movable brushes so arranged that two or more sides of the citrus fruit may be engaged simultaneously by a brush.

A further object of the invention is to provide a washing or scrubbing machine including a series of fixed brushes and a series of movable brushes with the brushes so disposed as to form a V.

A further object of the invention is to provide two sets of brushes arranged in V formation with movable brushes disposed above the two brush sets.

Another object of the invention is to provide a fruit washing machine including an endless belt having brushes thereon and wherein alternate brushes are arranged in staggered relation.

Another object of the invention is to provide a movable brush element and a pivoted brush element disposed over the movable brush element.

An additional object of our invention is to provide an improved means for holding a brush in place on a conveyor.

Other objects of the invention and the advantages thereof will be apparent from the following description taken in connection with the accompanying drawings wherein:

Fig. 1 is a central sectional view through a washing machine embodying the features of our invention.

Fig. 2 is a section on line 2—2 of Fig. 1.

Fig. 3 is a section on line 3—3 of Fig. 1.

Fig. 4 is a section on line 4—4 of Fig. 1.

Fig. 5 is a fragmentary elevation showing the conveyor chain and brush assembly.

Fig. 6 is an end view of one of the brushes and its pocket, and

Fig. 7 is a top plan view showing our invention.

Referring to the drawings by reference characters we have shown our invention as embodied in a tank indicated generally at 10 which includes a bottom 11, ends 12, and sides 13.

The sides of the tank are provided with suitable bearings to support shafts 14, 15 and 16 which have sprocket wheels 17, 18 and 19 thereon. The sprocket wheels 17 and 18 are of equal diameter while the sprocket wheel 19 has less teeth than the other sprockets. An endless chain 20 which fits the sprockets may be driven from any sprocket, although we now prefer to make the sprocket 18 the drive sprocket.

The shafts 14 and 15 are arranged in the same horizontal plane while the shaft 16 is disposed above and to one side of the shaft 15 so that in operative position the chain assumes the position shown in Fig. 1.

Mounted upon the chain 20 we show a plurality of triangular or wedge shaped blocks 21, which preferably have their edges slightly bevelled and are arranged in side by side relation as shown in Fig. 1.

The side walls 13 of the tank are provided with brackets 22 which support transverse channels 23 and these transverse channels support longitudinally extending channels 24. The channels 24 are spaced apart a distance somewhat less than the length of the base of the triangular blocks 21 and the working reach of the chain engages the channels 24 as shown in Fig. 1.

In Fig. 5 we have shown in detail the block 21 which is held on the chain 20 by lugs 26 which receive screws 27. The block is recessed as at 28 to receive the sprocket teeth, and the inclined sides 29 of each block are provided with a brush holding pocket 30. This pocket 30 includes a base 31 which is held upon the sides 20 by screws 32, sides 33, a lower end 34 and top flanges 35. The pockets 30 are preferably made of metal and terminate short of the top of the block 21.

The brush elements shown at 36 include a back 37 which projects to receive the flange 35. Each block is provided with a removable locking member 38 which engages the ends of the brush backs 37 and which is held in place by screws 39 which enter the block 21.

From the foregoing description it will be apparent that the brush elements may be removed for repairing or renewal by removing the screws 39 and the locking member 38, after which the brushes can be slipped in their pockets.

The brushes 36 are shown as of two heights. First a short brush, then a long brush, then a short one, etc., although the particular arrangement is immaterial so long as the working faces of the brushes are staggered.

Adjacent each side of the tank we provide inclined base members 40, each of which receives a plurality of the brush pockets 30 and brushes 36'. The brushes 36' are preferably of greater width than the brushes 36 and the brushes 36' differ in height as clearly shown in the drawings.

Disposed above the tank we show transverse members 41 which support a shaft 42 having opposed pairs of brushes 43 and 44 pivotally mounted thereon as shown in Fig. 2. These brushes are positioned above the brushes 36 and 36' so that an article such as an orange 45 will be engaged on three faces as it passes through the washing machine.

To limit the downward movement of the brushes 43 and 44 we provide stop members 46 which may take the form of hollow pipes having spraying apertures therein. The tank is also shown as provided with pipes 47 which may have spraying apertures therein.

Our invention is adapted for use with the tank filled to the desired height with water or other liquid and with the pipes 46 and 47 out of use. Or the tank may be provided with a suitable overflow or drain and the articles passing through the tank may be washed by fluid discharged through the spraying apertures of the pipes 46 and 47. Or if preferred the tank may be built to the desired height and the fruit may also be washed with the spray from the pipes 46 and 47.

The ends of the tank are provided with a pair of chutes 50 to receive and direct fruit from the brushes and may be provided with a plurality of discharge chutes 51.

In operation the chain 20 is started and fruit is fed to the chute 50. This fruit will pass on to the brushes adjacent the end of the chute 50 and the fruit will be conveyed by movement of the brushes 36 towards the discharge end of the tank. The staggered height of the brushes will cause a rolling and thorough scrubbing action to be effected and the pivoted brushes 43 will increase the rotation and scrubbing effect.

When the brushes 43 are not desired for use they may be raised to vertical position and secured. After the fruit has passed the brushes it will be discharged onto the discharge chutes 51.

It will be understood that our invention may be embodied in a pair of brushing devices disposed side by side as shown in the drawings, or if desired a single brushing device may be provided according to the requirements of the plant in which the invention is installed.

The chain 20 may be driven in any desired manner although we have shown it as adapted to be driven from a power shaft 55 which may have a drive pulley 56 thereon.

For cleaning the traveling brushes 36 we preferably provide a plurality of combs 58 supported at an angle on members 59 on the bottom 11 of the tank. As the brushes 36 pass the combs 58 the teeth thereof engage and agitate the bristles of the brushes causing any caked dirt or other refuse to fall out of the brushes.

From the foregoing description it will be apparent that we have provided an improved washer which is simple in construction and efficient in use.

Having thus described our invention, we claim:

1. In a fruit washing machine, two sets of brushes arranged with their working faces in V formation and a set of brushes having a horizontally arranged working face and mounted to swing about an axis arranged at one side of the apex of said V.

2. In a fruit washing machine, two sets of brushes arranged with the faces of the two sets arranged in V shape, means to continuously move one of said sets in one direction to convey articles thereon and a brush element disposed over said first mentioned sets of brushes.

3. In a fruit washing machine, an endless chain, a triangular block having the base thereof secured to said chain, a brush holding pocket on one face of said block, said pocket including a bottom secured to the block, opposed sides, an end, and top flanges, a brush having a back engaging said top flanges, a locking member arranged adjacent the end of said pocket, and means to hold said locking member in position.

4. In a fruit washing machine, a tank, a plurality of sprockets mounted in said tank, an endless chain engaging said sprockets, a stationary brush in said tank and inclined from the perpendicular, a brush element carried by and movable with said chain, said brush element being inclined towards said stationary brush element.

5. In a fruit washing machine, a tank, a plurality of sprockets mounted in said tank, a chain engaging said sprockets, a plurality of wedge shaped blocks arranged on said chain in edge to edge relation, a pair of brush elements carried by each of said blocks, an inclined base adjacent each side of said tank, a plurality of brush elements mounted on said base and forming V shaped grooves in connection with said first brush elements, and a plurality of brushes disposed above said first mentioned brush elements.

6. In a fruit washing machine, a tank, a sprocket mounted at one end of said tank, a second sprocket mounted at the other end of said tank, a third sprocket disposed above said second sprocket and of smaller size than said second sprocket, an endless chain engaging all of said sprockets, a plurality of wedge shaped blocks arranged on said chain in edge to edge relation, a pair of guide rails mounted in said tank, said guide rails serving to support a portion of the blocks which are on the upper reach of said chain, and a removable brush element carried by each of said blocks, said brush elements being staggered in height.

7. In a fruit washing machine, a tank, a sprocket mounted at one end of said tank, a second sprocket mounted on the other end of said tank, a third sprocket disposed above said second sprocket, an endless chain engaging all of said sprockets, a plurality of wedge shaped blocks arranged on said chain in edge to edge relation, a pair of guide rails mounted in said tank, said guide rails serving to support a portion of the blocks which are on the upper reach of said chain, a pair of brush elements carried by each of said blocks, said brush elements being staggered in height, an inclined base adjacent each side of said tank, a plurality of brush elements mounted on said base and forming a V-shaped groove in connection with said first brush elements, and a plurality of pivotally mounted brushes disposed above said first mentioned brush elements.

8. In a fruit washing machine, a tank, an endless chain mounted to move in said tank, a plurality of brush elements carried by said chain, a second plurality of brush elements, said two brush elements having their faces inclined to form a V shaped groove, a third set of brush elements, said third set of brush elements being arranged over said first and second brush elements and said third set of brush elements being pivoted to move about an axis arranged at one side of the apex of said V shaped groove, a loading chute and a discharge chute, said loading chute being adapted to dispose articles on said first brush elements, said first brush elements being adapted to convey said articles past said second and third brush elements and elevate said articles out of said tank and discharge them on said discharge chute.

9. In a fruit washing machine, a tank, a pair of spaced brush elements in said tank, a second pair of brush elements disposed between said first brush elements, one brush element of said first pair coacting with one brush element of said second pair to form an article receiving groove, one of said brush elements being movable, a third pair of brush elements disposed over said other brush elements, said third brush elements being pivoted and freely movable, a spray pipe adjacent each side of said tank adapted to direct a fluid on articles in said article receiving groove and other spray pipes adjacent the center of said tank adapted to direct a fluid on articles in said article receiving groove, said other spray pipes being disposed to support said third pair of brush elements.

10. In a fruit brushing machine a pair of brushing elements, one of which comprises an endless row of movable brushes having their brushing faces disposed angularly with respect to the brushing face of the other brushing element to form therewith a longitudinal trough, the brushes of the endless row being arranged in staggered relation to form a corrugated brushing surface, and means for moving the endless row of brushes longitudinally of the other brushing element to convey articles along the trough.

11. In a fruit brushing machine a row of stationary brushes, an endless row of movable brushes, the working faces of the rows of brushes being angularly disposed to form a longitudinal V shaped trough, and the brushes of the movable row being arranged in alternately staggered relation to form a corrugated brushing surface, and means for operating the movable row of brushes longitudinally of the other row to convey articles along the trough.

12. In a fruit washing machine, a brush supporting member having diverging upper faces, a brush holding pocket secured to each of said faces, said brush holding pocket including a bottom, opposed sides, an end member and top flanges on said sides, a brush having a back engaging said top flanges and a single locking member removably secured to said supporting member, said locking member including a pair of engaging faces, each of said engaging faces engaging the end of one brush back.

13. In a fruit washing machine, a washing tank, a pair of brush elements having plane working faces with one of the brush elements being disposed in said tank and cooperating with the other brush element of the pair to form a brushing trough, and horizontally movable in the tank to convey articles along said trough, said brushing elements having working faces consisting of alternately positioned and transversely arranged depressions inclined to the horizontal, and a freely movable pivotally mounted brush element disposed over said first brush elements, the axis of the pivot of said last mentioned brush element being arranged parallel to the direction of movement of the movable brush element.

14. In a fruit washing machine, a washing tank, a pair of brush elements in said tank forming a lower set of one of which is movable longitudinally relative to the other to move fruit therealong, the brushing faces of said pair consisting of alternately positioned and transversely arranged depressions inclined to the horizontal and arranged to form a brushing trough, another set of brush elements comprising a series of pivotally mounted brushes positioned over said brushing trough to be engaged and lifted by the fruit passing thereunder, the pivot of said brush elements being parallel and at one side of the path of travel of the fruit along said trough and the plane of movement of said brush elements being substantially at right angles to the path of travel of fruit along said trough.

15. In a fruit washing machine, a brushing runway comprising a stationary brushing element and an endless horizontally movable brushing element, said brushing elements being provided with staggered brushing surfaces which forms a series of stepped faces lying in different planes, the plane of each face being positioned parallel to the line of moving fruit and each being inclined to the horizontal with means for moving the endless element.

16. In a fruit cleaning apparatus, a row of stationary brushes, an endless conveying and brushing device mounted to travel longitudinally of and parallel to said row of stationary brushes and having its brushing surface inclined toward the stationary brushes to form a fruit brushing trough, the brushing surfaces of the endless brushing device being provided with a series of alternately positioned and transversely arranged depressions to cause the fruit to be engaged by the bristles adjacent said depressions, and means for driving said endless brushing device to convey fruit along the trough.

17. In a fruit cleaning machine, a row of stationary brushes, an endless conveying and brushing device mounted to travel longitudinally of and parallel to said row of stationary brushes and having a brushing surface inclined toward the stationary brushes to form a fruit brushing trough, the brushing surface of the endless brushing device being provided with corrugations inclined transversely toward the stationary brushes to form fruit engaging pockets, and means for driving said endless device to convey fruit along said trough, the said corrugations being the means for moving the fruit.

18. In a fruit brushing machine a row of stationary brushes, an endless row of movable brushes, the working faces of the rows of brushes being angularly disposed to form a longitudinal V shaped trough, and the brushes of the movable row being arranged in alternately staggered relation to form a corrugated brushing surface, means for operating the movable row of brushes longitudinally of the other row to convey articles along the trough, and a third row of brushes disposed above the trough to contact with articles thereon, the brushes comprising said third row being individually pivoted for swinging movement in a plane at right angles to the path of movement of articles in the trough.

FRANK B. ROBERTS.
WILLIS G. HUNTINGTON.